(12) United States Patent
Watabe

(10) Patent No.: US 8,636,043 B2
(45) Date of Patent: Jan. 28, 2014

(54) PNEUMATIC TIRE

(75) Inventor: Ryoichi Watabe, Nakano-ku (JP)

(73) Assignee: Bridgestone Corporation, Tokyo (JP)

( * ) Notice: Subject to any disclaimer, the term of this patent is extended or adjusted under 35 U.S.C. 154(b) by 890 days.

(21) Appl. No.: 12/307,194

(22) PCT Filed: Jul. 2, 2007

(86) PCT No.: PCT/JP2007/063244
§ 371 (c)(1),
(2), (4) Date: Dec. 31, 2008

(87) PCT Pub. No.: WO2008/004522
PCT Pub. Date: Jan. 10, 2008

(65) Prior Publication Data
US 2010/0000642 A1  Jan. 7, 2010

(30) Foreign Application Priority Data

Jul. 6, 2006 (JP) .................................. 2006-187135
Aug. 30, 2006 (JP) .................................. 2006-234461

(51) Int. Cl.
*B60C 11/00* (2006.01)

(52) U.S. Cl.
USPC .................. 152/209.1; 152/209.3; 152/209.18

(58) Field of Classification Search
USPC ............................... 152/209.1, 209.3, 209.18
See application file for complete search history.

(56) References Cited

U.S. PATENT DOCUMENTS 5,964,266 A * 10/1999 Boiocchi et al. ........... 152/209.2

FOREIGN PATENT DOCUMENTS

| EP | 0 295 195 A1 | 12/1988 |
|---|---|---|
| JP | 2001-354011 A | 12/2001 |
| JP | 2004-075025 A | 3/2004 |
| JP | 2004-306906 A | 11/2004 |
| JP | 2004-345405 A | 12/2004 |
| JP | 2005-297695 A | 10/2005 |

OTHER PUBLICATIONS

English translation of JP 2005-297695, Oct. 27, 2005, from JPO machine translation.*
Supplementary European Search Report dated Jan. 14, 2010 (4 pages).
Japanese Office Action issued in Japanese Application No. 2006-187135 dated Mar. 29, 2011.

* cited by examiner

*Primary Examiner* — Jacob Thomas Minskey
(74) *Attorney, Agent, or Firm* — Sughrue Mion, PLLC

(57) ABSTRACT

A pneumatic tire exhibiting high traction performance. A center circumferential groove (14) is provided on the equator (CL) of the tread (12), and between shoulder circumferential grooves (18) on both sides of the center circumferential groove (14) are arranged first lateral grooves (20) formed at a smaller angle relative to the axial direction of the tire than the first lateral groove (20). One end of each first lateral groove (20) and one end of each second lateral groove (22) are made to merge at a shoulder circumferential groove (18), and shoulder lateral grooves (23) are arranged on the outer side of each shoulder circumferential groove (18). Each shoulder lateral groove (23) extends from the merging portion toward a tread end (12E) and is formed at a smaller angle relative to the axial direction of the tire than that of the first lateral groove (20). Because the angle of the shoulder lateral grooves (23) relative to the axial direction of the tire is less, traction performance of the tire increases.

5 Claims, 6 Drawing Sheets

PNEUMATIC TIRE

TECHNICAL FIELD

The present invention relates to a pneumatic tire, and particularly relates to a pneumatic tire that excels in traction performance.

BACKGROUND ART

Pneumatic tires have been proposed that are provided with circumferential direction grooves and with lateral grooves which are inclined relative to a tire lateral direction (see, for example, Patent Reference 1).
Patent Reference 1: Japanese Patent Application Laid-Open (JP-A) No. 2005-297695

DISCLOSURE OF INVENTION

Problem to be Solved by the Invention

On a conventional pneumatic tire, between a pair of shoulder circumferential grooves, first lateral grooves, which are inclined relative to a tire axial direction, and second lateral grooves, at a smaller angle relative to the tire axial direction than the first lateral grooves, are formed. At outer sides of the shoulder circumferential grooves, third lateral grooves are provided on lines of extension of the first lateral grooves.

Even with conventional pneumatic tires, a certain level of traction performance is obtained. However, further improvements in traction performance are required in the marketplace.

The present invention has been made in order to solve the problem described above, and an object is to provide a pneumatic tire with traction performance that is further improved relative to hitherto.

Means for Solving the Problem

A pneumatic tire according to claim 1 includes: a center circumferential groove provided on an equator of a tread; shoulder circumferential grooves provided at both sides in a tire lateral direction of the center circumferential groove of the tread and at tire lateral direction outermost sides; first lateral grooves that are provided in the tread, extend away from the equator toward the shoulder circumferential grooves, and are inclined at $\theta_1°$ relative to a tire axial direction; and second lateral grooves that are provided in the tread, extend away from the equator toward the shoulder circumferential grooves, and are set to an inclination angle relative to the tire axial direction of $\theta_2°$, which is smaller than $\theta_1°$, wherein the first lateral grooves and the second lateral grooves merge at the shoulder circumferential grooves, and shoulder lateral grooves are provided in the tread, at an inclination angle relative to the tire axial direction of $\theta_3°$ of which is set to be smaller than $\theta_1°$, the shoulder lateral grooves extending from portions at which the first lateral grooves merge with the second lateral grooves toward tread ends.

Next, operation of the pneumatic tire according to claim 1 will be described.

In this pneumatic tire, the tread is provided with a plurality of blocks which are demarcated by the plurality of circumferential grooves and the plurality of lateral grooves that are inclined relative to the tire axial direction. Thus, edges of the lateral grooves contribute to traction. Moreover, in relation to traction, the edges of the lateral grooves are parallel with respect to the tire axial direction, which is most preferable.

In the pneumatic tire according to claim 1, the inclination angle $\theta_3°$ of the shoulder lateral grooves relative to the tire axial direction is set to be smaller than the first lateral grooves whose angle relative to the tire axial direction ($\theta_1°$) is largest. Thus, edges of the shoulder lateral grooves may be brought close to parallel to the tire axial direction, and traction performance may be improved beyond heretofore.

Further, the first lateral grooves that are inclined relative to the tire axial direction extend away from the tire equator toward the shoulder circumferential grooves, and are then communicated with the shoulder lateral grooves that extend toward the tread ends. Thus, during running on a wet road surface, water in the vicinity of the middle of the tread is efficiently ejected toward the tread ends, and a high wet-hydroplaning performance may be assured.

Further, in the tread of this pneumatic tire, it is specified that there are fewer lateral grooves at the shoulder side than at the equator side. Thus, lug stiffness at the shoulder side is comparatively higher than at the equator side, deformation of lugs at the shoulder side when the tread patch inclines to the shoulder side, for example, during cornering, is moderated, and a high handling stability performance is obtained.

A pneumatic tire according to claim 2 is the pneumatic tire according to claim 1, in which the inclination angle $\theta_3°$ of the shoulder lateral grooves is smaller than $\theta_2°$.

Next, operation of the pneumatic tire according to claim 2 will be described.

Because the inclination angle of the shoulder lateral grooves $\theta_3°$ is set to be smaller than $\theta_2°$, the shoulder lateral grooves may be brought even closer to parallel to the tire axial direction, and traction performance due to the shoulder lateral grooves may be further improved.

A pneumatic tire according to claim 3 is the pneumatic tire according to claim 1 or claim 2, in which, at a tread surface, lateral sipes extending in the tread lateral direction are formed in a plurality of blocks that are formed by the plurality of grooves extending in the tire circumferential direction and the tire lateral direction, of the plurality of blocks, center blocks which are disposed at the equator side are smaller than shoulder blocks which are provided at the lateral direction outer sides relative to the center blocks, and at least a portion of the grooves that form the center blocks is formed with a raised floor face that is at a depth shallower than a depth from the tread surface to floor faces of the grooves that form the shoulder blocks.

Next, operation of the pneumatic tire according to claim 3 will be described.

According to this pneumatic tire, because at least a portion of the grooves that form the center blocks is formed with the raised floor face, stiffness of the center blocks and stiffness of the shoulder blocks are equivalent. Thus, running performance on dry road surfaces, wet road surfaces, icy/snowy road surfaces and the like, and particularly handling stability performance, acceleration performance and braking performance on icy/snowy road surfaces may be improved.

Moreover, because the lateral sipes are formed in the blocks (the center blocks and the shoulder blocks), grip strength on icy/snowy road surfaces is improved (which is referred to as the edge effect), and handling stability performance, acceleration performance and braking performance on icy/snowy road surfaces may be improved. In addition, water, snow or the like at the ground plane (between the tread surface and the road surface) may be released along the lateral sipes and hydroplaning, the phenomenon in which a tire floats, may be prevented.

Furthermore, because the center blocks are disposed at the equator side relative to the shoulder blocks, volume of the grooves that form the center blocks is assured, and shear strength (shearing force) is not lowered by snow columns at the shoulder blocks. Therefore, running performance, such as handling stability performance, acceleration performance, braking performance, traction performance and the like, on dry road surfaces, wet road surfaces, icy/snowy road surfaces and the like may be improved.

A pneumatic tire according to claim 4 is the pneumatic tire according to claim 3, in which, of an adjoining plurality of the center blocks, at least a portion of the grooves that form one of the center blocks is formed with a highest raised floor face that is at a depth shallower than the depth to the raised floor face.

Next, operation of the pneumatic tire according to claim 4 will be described.

According to this pneumatic tire, at least a portion of the grooves that form one center block of the plural adjoining center blocks is formed with the highest raised floor face. Therefore, a reduction in stiffness of the center blocks may be further moderated, and running performance, such as handling stability performance, acceleration and braking performance, traction performance and the like, on dry road surfaces, wet road surfaces, icy/snowy road surfaces and the like may be further improved.

A pneumatic tire according to claim 5 is the pneumatic tire according to claim 3 or claim 4, in which circumferential sipes extending in the circumferential direction are formed in the shoulder blocks.

Next, operation of the pneumatic tire according to claim 5 will be described.

According to this pneumatic tire, because the circumferential sipes are formed in the shoulder blocks, friction at the ground plane during cornering may be increased and lateral sliding during cornering may be prevented, in addition to which hydroplaning during cornering on wet road surfaces, icy/snowy road surfaces and the like may be prevented.

A pneumatic tire according to claim 6 is the pneumatic tire according to any one of claim 3 to claim 5, in which, of an adjoining plurality of the center blocks, at least one block is a triangular block that is formed with a triangular shape in a plan view of the tread, and at least one of the grooves that form the triangular block is inclined at the floor face thereof and is formed with an inclined narrow groove that is narrower than the groove.

A pneumatic tire according to claim 7 is the pneumatic tire according to claim 6, in which pinholes are formed that are provided in the triangular block and extend inward from the tread surface in a tire radial direction.

Effects of the Invention

As described hereabove, the pneumatic tire of the present invention, being constituted as described above, has an excellent effect in being capable of further improving traction performance relative to hitherto.

BRIEF DESCRIPTION OF THE DRAWINGS

FIG. 2 is a development view showing the tread pattern of a pneumatic tire.

FIG. 3 is a perspective view of blocks that constitute the tread surface of the pneumatic tire.

FIG. 4 is a lateral sectional view of the tread of the pneumatic tire (sectional view A-A of FIG. 2).

FIG. 5 is a lateral sectional view of the tread of the pneumatic tire (sectional view B-B of FIG. 2).

FIG. 6 is a circumferential sectional view of the tread of the pneumatic tire (sectional view C-C of FIG. 2).

BEST MODE FOR CARRYING OUT THE INVENTION

First Exemplary Embodiment

Based on FIG. 1, a pneumatic tire 10 relating to a first exemplary embodiment of the present invention will be described.

Figure 1:
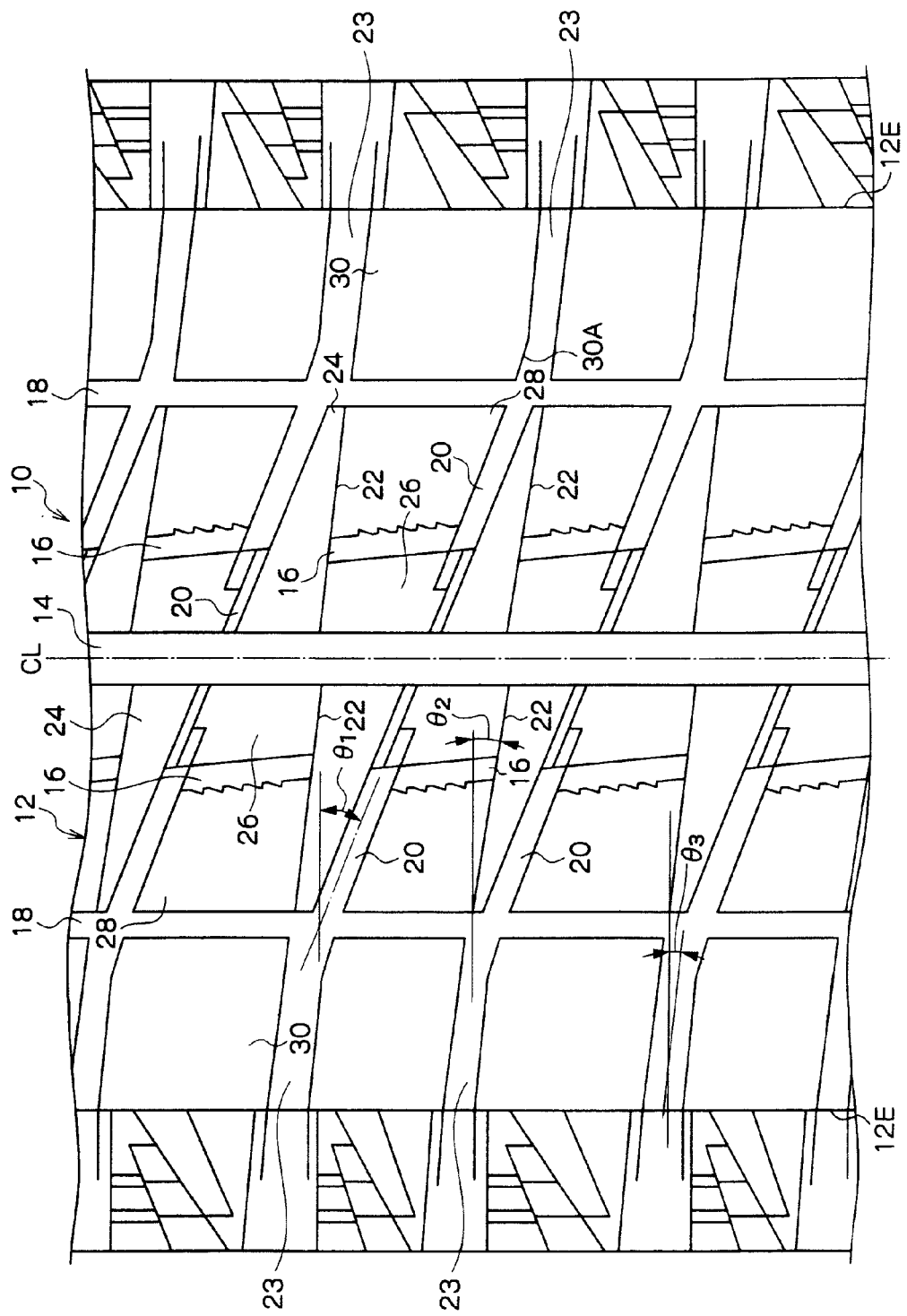
FIG. 1 is a plan view of the tread of a pneumatic tire relating to a first exemplary embodiment of the present invention.

As shown in FIG. 1, in a tread 12 of the pneumatic tire 10 of the present exemplary embodiment, a center circumferential groove 14 is formed on a tire equator CL. At both sides of the center circumferential groove 14, second circumferential grooves 16 are formed. Further, at tire lateral direction outer sides of the second circumferential grooves 16, shoulder circumferential grooves 18 are formed.

The center circumferential groove 14 is continuous in the circumferential direction with a constant width and extends in a linear form.

The second circumferential grooves 16 do not extend continuously in the circumferential direction as the center circumferential groove 14 does but are provided at intervals in the circumferential direction.

The shoulder circumferential grooves 18 are continuous in the circumferential direction with a constant width, which is narrower than that of the center circumferential groove 14, and extend in linear forms.

In the tread 12, between the center circumferential groove 14 and the shoulder circumferential grooves 18, first lateral grooves 20 and second lateral grooves 22 are provided alternately in the circumferential direction. The first lateral grooves 20 are inclined at an angle $\theta_1°$ relative to the axial direction of the tire, upward to the left. The second lateral grooves 22 are inclined at an angle $\theta_2°$, which is a smaller angle relative to the tire lateral direction than that of the first lateral grooves 20.

The first lateral grooves 20 connect the equator CL with the shoulder circumferential grooves 18, and widths at the equator CL side thereof are set to be narrower than widths at the shoulder circumferential groove 18 side.

Meanwhile, the second lateral grooves 22 connect the equator CL with the shoulder circumferential grooves 18, and are set to a width that is narrower than the first lateral grooves 20 and is constant. Herein, the first lateral grooves 20 and the second lateral grooves 22 merge at the shoulder circumferential grooves 18.

Further, in the tread 12, shoulder lateral grooves 23 extend from the portions at which the first lateral grooves 20 merge with the second lateral grooves 22 toward tread ends 12E.

An angle of inclination $\theta_3°$ relative to the tire axial direction of the shoulder lateral grooves 23 is set to be smaller than the angle of inclination $\theta_1°$ of the first lateral grooves 20.

Now, between the center circumferential groove 14 and the shoulder circumferential grooves 18, triangular blocks 24, center rectangular blocks 26 and second rectangular blocks 28 are demarcated by the center circumferential groove 14, the shoulder circumferential grooves 18, the second circumferential grooves 16, the first lateral grooves 20 and the second lateral grooves 22. The second circumferential grooves 16 connect equator side end portions of the wider portions of the first lateral grooves 20 with central portions of the second lateral grooves 22.

Further, at the tire lateral direction outer sides of the shoulder circumferential grooves 18, shoulder blocks 30 are provided, which are demarcated by the shoulder circumferential grooves 18 and the shoulder lateral grooves 23.

At a shoulder circumferential groove 18 side corner portion of each shoulder block 30, a chamfer 30A is formed on a line of extension of a groove wall of the first lateral groove 20. Thus, water that flows through the first lateral groove 20 will flow smoothly into the shoulder lateral groove 23.

Each triangular block 24 presents a triangular shape which is long and thin in the tire lateral direction, with the sharpest corner portion (hereinafter referred to as a sharp corner portion) oriented toward the shoulder circumferential groove and a base edge at the opposite side of the triangular block 24 from the acute angle corner portion oriented toward the equator CL.

Between the first lateral grooves 20 and the second lateral grooves 22, the center rectangular blocks 26 are disposed at the base edge sides of the triangular blocks 24 and the second rectangular blocks 28 are disposed at the sharp corner portion sides of the triangular blocks 24. The shoulder blocks 30 are disposed at the tire lateral direction outer sides of the second rectangular blocks 28. These fours of blocks form long, thin triangular shapes in the tire lateral direction.

Because the first lateral grooves 20 and the second lateral grooves 22 are provided alternately in the tire circumferential direction, the triangular shapes formed by these fours of blocks are arranged in the tire circumferential direction with orientations thereof being made different from one another.

Herein, suitable sipes or the like may be provided in the tread 12 of the present exemplary embodiment.

—Operation—

In the tread 12 of the pneumatic tire 10 of the present exemplary embodiment, a block pattern is constituted by the triangular blocks 24, the center rectangular blocks 26, the second rectangular blocks 28 and the shoulder blocks 30, and a basic performance that enables running on ice/snow is obtained.

Because the triangular blocks 24 are provided with the acute angle corner portions in a plan view of the tread, in running on snow, penetrative force into a snowy road is increased and running performance is improved. On an icy road, contact pressure at that region may be increased, and braking and traction on the ice are improved.

Edges of the first lateral grooves 20, second lateral grooves 22 and shoulder lateral grooves 23 formed in the tread 12 contribute to traction. The angle of inclination $\theta_3°$ of the shoulder lateral grooves 23 relative to the tire axial direction is set to be smaller than the angle of inclination $\theta_1°$ of the first lateral grooves 20, and is brought close to parallel to the tire axial direction. Thus, high traction performance is obtained. Herein, it is preferable if the angle of inclination $\theta_3°$ of the shoulder lateral grooves 23 relative to the tire axial direction is set to be smaller than the angle of inclination $\theta_2°$ of the first lateral grooves 20, and making the inclination angle $\theta_3°$ parallel to the tire axial direction is most preferable. Specifically, the angle of inclination $\theta_3°$ is preferably at most 30°.

Further, because the first lateral grooves 20 which are inclined at a larger angle relative to the tire axial direction are in communication, from the equator side, with the shoulder lateral grooves 23 that are in communication with the tread ends 12E, during driving on a wet road surface, water in the vicinity of the middle of the tread is efficiently ejected toward the tread ends 12E, and a high wet-hydroplaning performance may be assured.

Moreover, in the tread 12 of the pneumatic tire 10 of the present exemplary embodiment, because there are fewer lateral grooves at the shoulder side than at the equator CL side, lug stiffness is comparatively higher at the shoulder side than at the equator CL side. Thus, when the tread patch inclines to the shoulder side, for example, during cornering, deformation of the lugs at the shoulder side is moderated, and a high handling stability performance is obtained.

Second Exemplary Embodiment

Next, a second exemplary embodiment of the pneumatic tire relating to the present invention will be described while referring to the drawings. In the descriptions of the drawings herebelow, portions that are the same or analogous are assigned the same or analogous reference numerals. Here, the drawings are schematic and it should be noted that ratios of respective dimensions and suchlike are different from practical structures. Accordingly, specific dimensions and the like shall be determined in consultation with the following descriptions. Moreover, portions are included of which mutual relationships and ratios of dimensions differ one from another between the drawings.

Figure 2:
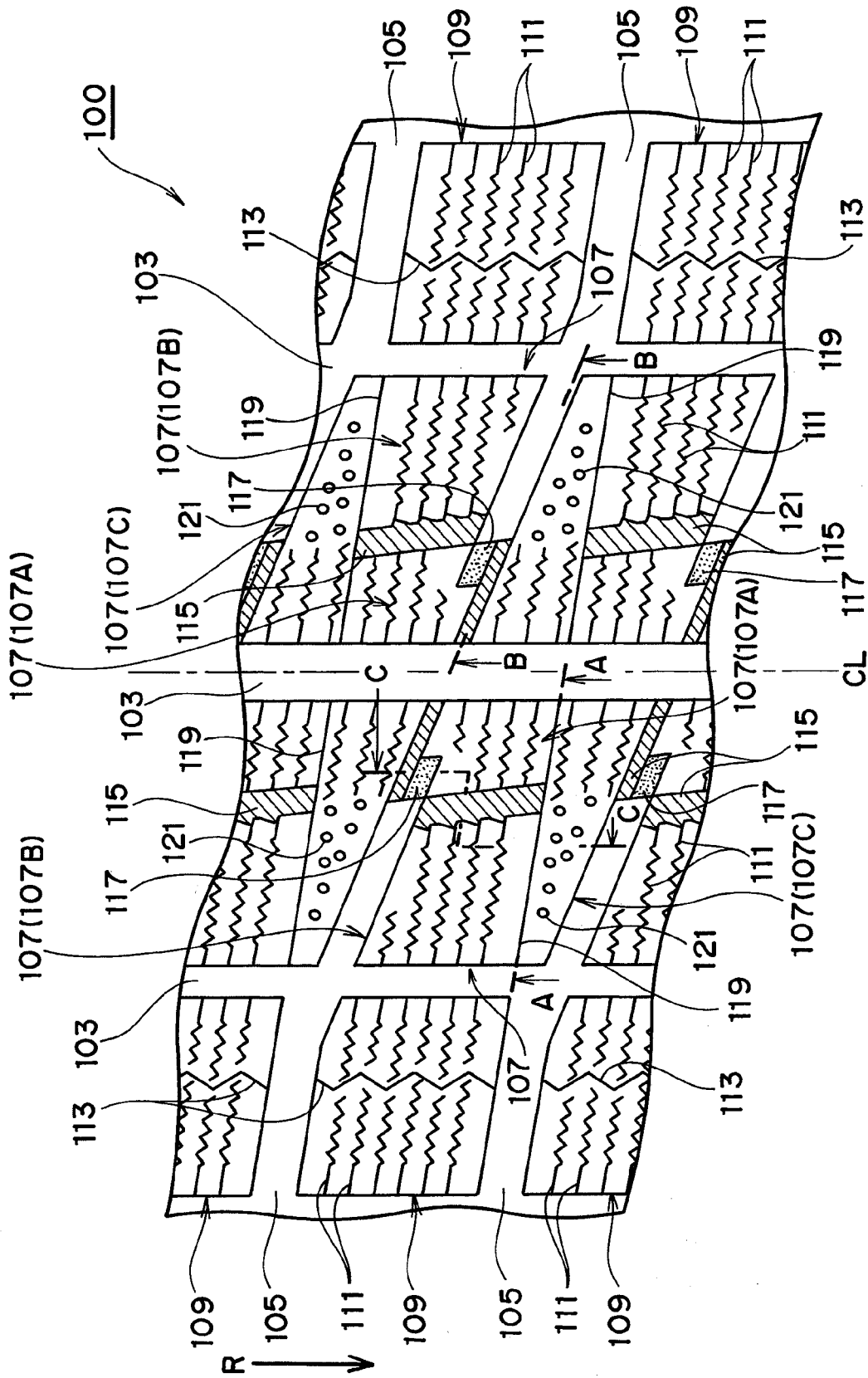
FIG. 2 to FIG. 6 relate to a second exemplary embodiment of the present invention.
Figure 3:
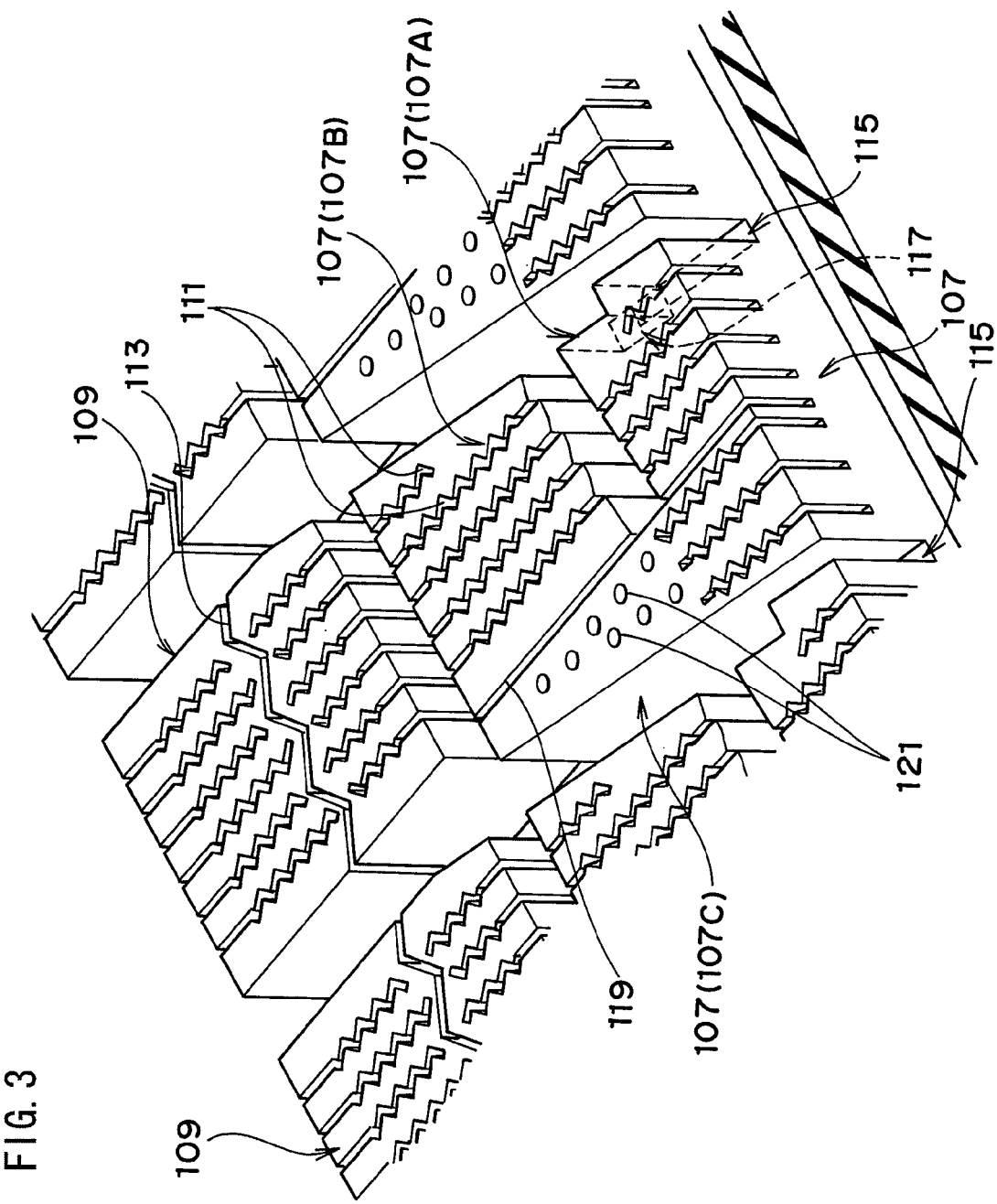
Figure 4:
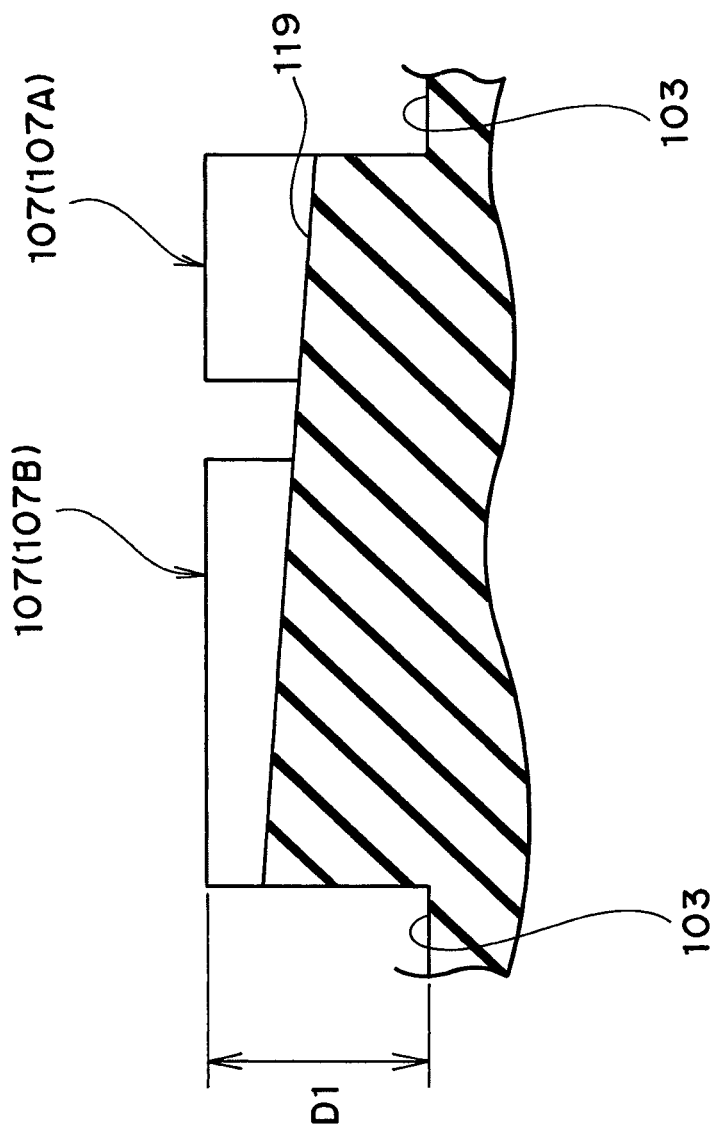
Figure 5:
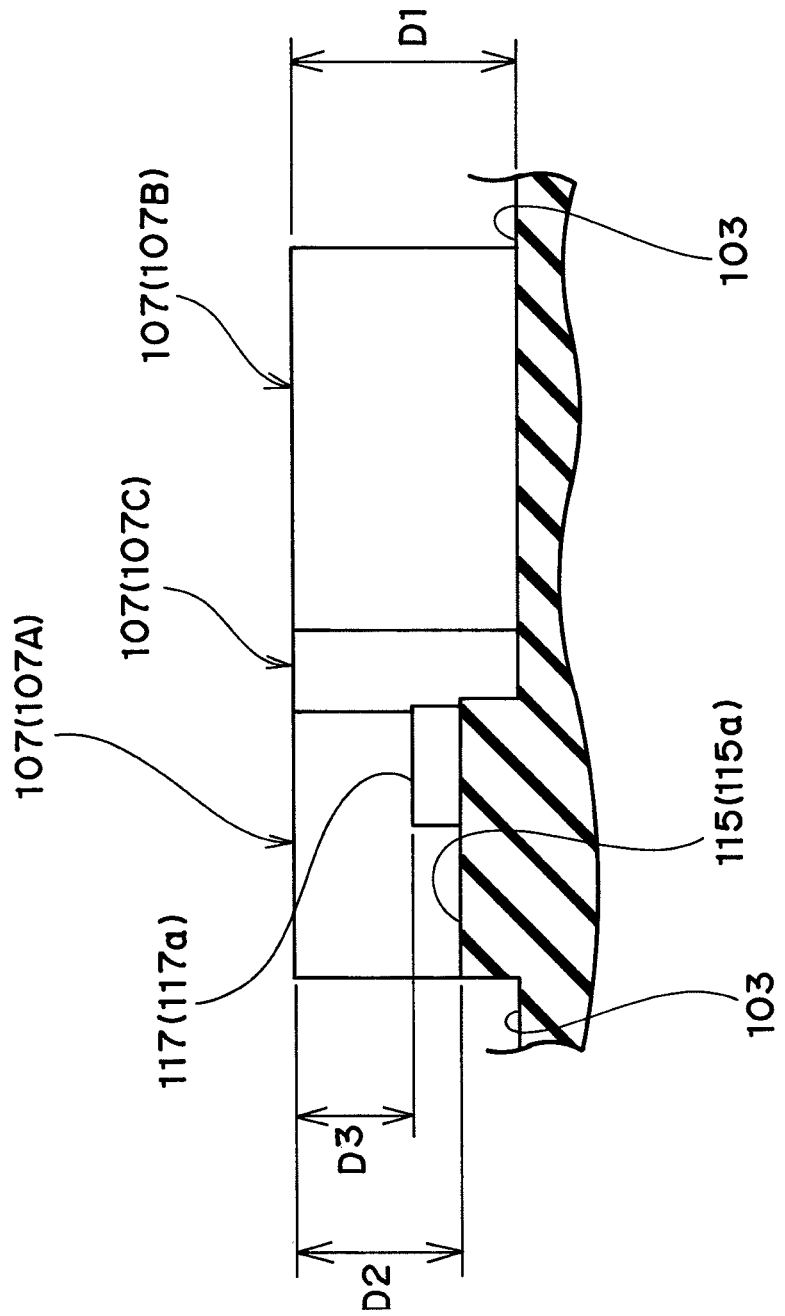
Figure 6:
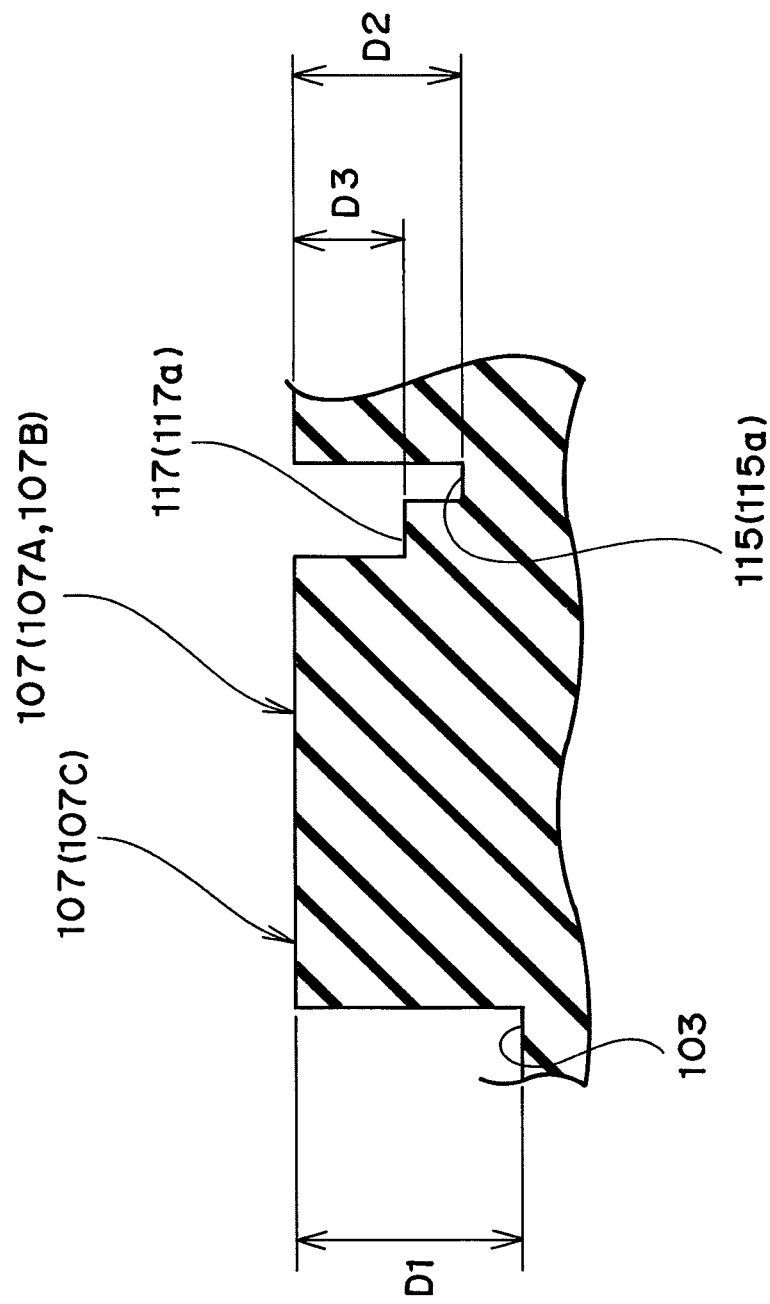

FIG. 2 is a development view showing the tread pattern of a pneumatic tire, FIG. 3 is a perspective view of blocks that constitute the tread surface of the pneumatic tire, FIG. 4 is a lateral sectional view of the tread of the pneumatic tire (sectional view A-A of FIG. 2), FIG. 5 is a lateral sectional view of the tread of the pneumatic tire (sectional view B-B of FIG. 2), and FIG. 6 is a circumferential sectional view of the tread of the pneumatic tire (sectional view C-C of FIG. 2).

The pneumatic tire relating to the present exemplary embodiment is an ordinary radial tire (a studless tire) provided with a bead, a carcass layer and a belt layer (not shown). Furthermore, the pneumatic tire relating to the present exemplary embodiment is for fitting to an automobile.

As shown in FIG. 2 and FIG. 3, at a tread surface 101 of the pneumatic tire, similarly to the first exemplary embodiment, plural circumferential grooves 103, which extend in the circumferential direction, and plural lateral grooves 105, which extend in the lateral direction of the tread, are formed.

At the equator CL side of the tread surface 101, center blocks 107, which are formed by the plural circumferential grooves 103 and the plural lateral grooves 105, are plurally (three in the drawing) adjacently provided. Shoulder blocks 109, which are formed by the plural circumferential grooves 103 and the plural lateral grooves 105 and are larger than the center blocks 107, are provided at the tread lateral direction outer sides of the center blocks 107. That is, the center blocks 107 are smaller than the shoulder blocks 109 that are disposed at the tread lateral direction outer side relative to the center blocks 107.

At each center block 107, lateral sipes 111 are formed, which extend in the tread lateral direction with zigzag forms being repeated. At each shoulder block 109, the lateral sipes 111 that extend in the tread lateral direction with the zigzag forms repeating and circumferential sipes 113, which extend in the circumferential direction with zigzag forms being repeated, are formed.

As shown in FIG. 4 to FIG. 6, at least some of the grooves that form the center blocks 107 (the circumferential grooves 103 and the lateral grooves 105) are formed with raised floor faces 115a, which have a depth (D2) shallower than a depth (hereinafter, an outer side groove depth (D1)) from the tread surface 101 to a floor face of the grooves that form the shoulder block 109 (the circumferential grooves 103 and the lateral grooves 105). At least a portion of the grooves that form one center block 107 of the plural adjoining center blocks 107 is formed with a highest raised floor face 117a, which has a depth shallower than the depth (D2) to the raised floor faces 115a.

Specifically, first, an inner side block 107A will be described. The "inner side block 107A" indicates the center block 107 that is disposed at the tread lateral direction inner side (the side closest to the equator CL) of a raised floor groove 115 that extends in the circumferential direction, that is, at least one of the plural adjoining center blocks 107.

As shown in FIG. 4 to FIG. 6, the inner side block 107A is formed by the circumferential groove 103, which has a floor at a depth the same as the outer side groove depth (D1), the raised floor grooves 115, which have the raised floor faces 115a with the depth (D2) shallower than the outer side groove depth (D1), a highest raised floor groove 117, which has the highest raised floor face 117a with the depth (D3) shallower than the depth to the raised floor face 115a (D2), and an inclined narrow groove 119 (D1>D2>D3).

The inclined narrow groove 119 indicates a narrow groove whose floor face is inclined upward toward the obtuse angle corner portion, and which is narrower (for example, a width of 1.5 mm or less) than the grooves (the circumferential grooves 103 and the lateral grooves 105). The inclined narrow groove 119 may be constituted by a sipe or the like.

The raised floor grooves 115 that have the raised floor faces 115a are disposed at the tread lateral direction outer side of the inner side block 107A and at the opposite side thereof from a direction of tire rotation R. The highest raised floor groove 117 that has the highest raised floor face 117a is disposed at the opposite side from the tire rotation direction R. The inclined narrow groove 119 is disposed at the side of the tire rotation direction R.

Next, an outer side block 107B will be described. The "outer side block 107B" indicates the center block 107 that is disposed at the tread lateral direction outer side (tread lateral direction outermost side) of the raised floor groove 115 that extends in the circumferential direction, that is, at least one of the plural adjoining center blocks 107.

As shown in FIG. 4 to FIG. 6, the outer side block 107B is formed by the circumferential groove 103 and lateral groove 105 which have floors at depths the same as the outer side groove depth (D1), the raised floor groove 115 which has the raised floor face 115a with the depth (D2) shallower than the outer side groove depth (D1), and the inclined narrow groove 119 (D1>D2).

The raised floor groove 115 which has the raised floor face 115a is disposed at the tread lateral direction outer side of the inner side block 107A. The inclined narrow groove 119 is disposed at the tire rotation direction R side.

Next, a triangular block 107C will be described. The "triangular block 107C" indicates the center block 107 that is formed in a triangular shape in a plan view of the tread and is disposed furthest to the tire rotation direction R side, that is, at least one of the plural adjoining center blocks 107.

As shown in FIG. 4 to FIG. 6, the triangular block 107C is formed by the circumferential groove 103 and the lateral groove 105 which have floors at depths the same as the outer side groove depth (D1), the raised floor groove 115 which has the raised floor face 115a with the depth (D2) shallower than the outer side groove depth (D1), and the inclined narrow groove 119 (D1>D2). That is, at least one of the grooves that form the triangular block 107C is formed by the inclined narrow groove 119.

The raised floor groove 115 which has the raised floor face 115a is disposed at the tire rotation direction R side. The inclined narrow groove 119 is disposed at the side opposite from the tire rotation direction R side.

Pinholes 121 are formed in the triangular block 107C, inward from the tread surface 101 in the radial direction of the tire. Herein, the triangular block 107C does not necessarily have to be a triangular shape in the tread plan view and naturally may be, for example, a quadrilateral shape in the tread plan view.

Thus, at least a portion of the grooves that form the center blocks 107 (the inner side block 107A, the outer side block 107B and the triangular block 107C) is formed with the raised floor face 115a which has the depth (D2) shallower than the outer side groove depth (D1). Furthermore, at least a portion of the grooves forming one center block 107 of the plural adjoining center blocks 107 (that is, the inner side block 107A) is formed with the highest raised floor face 117a which has the depth (D3) shallower than the depth to the raised floor face 115a (D2).

—Operation and Effects—

According to the pneumatic tire relating to the present exemplary embodiment described hereabove, at least a portion of the grooves that form the center blocks 107 (the circumferential grooves 103 and the lateral grooves 105) are formed with the raised floor face 115a. As a result, stiffness of the center blocks 107 and stiffness of the shoulder blocks 109 are equivalent, and running performance on dry road surfaces, wet road surfaces, icy/snowy road surfaces and the like, and particularly handling stability performance, acceleration performance and braking performance on icy/snowy road surfaces may be improved.

Moreover, because the lateral sipes 111 are formed in the blocks (the center blocks 107 and the shoulder blocks 109), grip strength on icy/snowy road surfaces is improved (which is referred to as the edge effect), and handling stability performance, acceleration performance and braking performance on icy/snowy road surfaces may be improved. In addition, water, snow or the like at the ground plane (between the tread surface and the road surface) may be released along the lateral sipes and hydroplaning, the phenomenon in which a tire floats, may be prevented.

Furthermore, because the center blocks 107 are disposed at the equator CL side relative to the shoulder blocks 109, volume of the grooves that form the shoulder blocks 109 is assured, and a shear strength (shearing force) is not lowered by snow columns at the shoulder blocks. Therefore, running performance, such as handling stability performance, acceleration performance, braking performance, traction performance and the like, on dry road surfaces, wet road surfaces, icy/snowy road surfaces and the like may be improved.

Further, at least a portion of the grooves that form one center block 107 of the plural adjoining center blocks 107 (that is, the inner side block 107A) is formed with the highest raised floor face 117a. Therefore, a reduction in stiffness of the center blocks 107 may be further moderated, and running performance, such as handling stability performance, acceleration and braking performance, traction performance and the like, on dry road surfaces, wet road surfaces, icy/snowy road surfaces and the like may be further improved.

Further, because the circumferential sipes 113 are formed in the shoulder blocks 109, friction at the ground plane during cornering may be increased, and lateral sliding during cornering may be prevented, in addition to which hydroplaning during cornering on wet road surfaces, icy/snowy road surfaces and the like may be prevented.

Further, because the triangular blocks 107C are triangular in the tread plan view, penetrative force of the triangular blocks 107C on an icy/snowy road surface is increased and running performance (for example, handling stability performance, acceleration and braking performance, traction performance and the like) on icy/snowy road surfaces may be further improved.

Further, because the pinholes 121 are formed in the triangular blocks 107C, a reduction in stiffness of the triangular blocks 107C may be moderated in comparison with sipes (the lateral sipes 111, the circumferential sipes 113), and water, snow or the like at the ground plane may be released into the pinholes 121. Therefore, running performance, such as handling stability performance, acceleration and braking performance, traction performance and the like, on dry road surfaces, wet road surfaces, icy/snowy road surfaces may be further improved.

Here, because the triangular block 107C is triangular in the tread plan view, a reduction in stiffness of the obtuse angle corner portion may be considered. However, the floor face of the inclined narrow groove 119 is inclined upward from the equator CL side toward the tread lateral direction outer side, in addition to which the pinholes 121 are provided, which are more excellent for stiffness than sipes. Thus, stiffness of the triangular block 107C may be assured.

Thus, deformation of the center blocks 107 which are smaller than the shoulder blocks 109 and are at the equator CL side, at which loads tend to be more greatly concentrated, may be moderated. Therefore, stiffness at the equator CL side within the center blocks 107 may be improved, and running performance, such as handling stability performance, acceleration and braking performance, traction performance and the like, on dry road surfaces, wet road surfaces, icy/snowy road surfaces may be further improved.

Other Exemplary Embodiments

While the present invention has been disclosed using exemplary embodiments of the present invention as described hereabove, descriptions and drawings constituting portions of the disclosure are not to be understood as limiting the present invention.

Specifically, the pneumatic tire relating to the present exemplary embodiments has been described as being an ordinary radial tire provided with a bead, a carcass layer and a belt layer (not shown). However, this is not limiting, and the pneumatic tire may be a tire other than a radial tire (for example, a bias tire).

Further, the pneumatic tire relating to the present exemplary embodiment has been described as being for mounting to an automobile. However, this is not limiting, and the pneumatic tire may be for mounting to a vehicle other than an automobile (for example, a bus or a truck).

Further, for the pneumatic tire relating to the present exemplary embodiment, it has been described that three of the center blocks 107 are adjacent: the inner side block 107A, the outer side block 107B and the triangular block 107C. However, this is not limiting; for example, the pneumatic tire may be formed with one of the center blocks 107, may have any two of the center blocks 107 adjoining, and may have three or more of the center blocks 107 adjoining.

From this disclosure, numerous substitute embodiments, examples and practical technologies will be clear to practitioners skilled in the art. Accordingly, the technical scope of the present invention is defined only by the matters specifying the invention of the claims based on the above descriptions.

Example 1

Next, to further clarify the effects of the present invention, results of the following tests, carried out using pneumatic tires relating to a Comparative Example and an Example, will be described. Note that the present invention is not to be limited by these Examples.

Data relating to the pneumatic tires was measured in the following conditions.

Tire size: 195/65R15
Wheel size: 15×6JJ
Internal pressure condition: 200 kPa
Vehicle condition: FR vehicle (displacement 2500 cc)
Loading condition: One driver+60 kg (corresponding to two occupants)

Firstly, structures of the pneumatic tires relating to the Comparative Example and Example will be described. The pneumatic tires have the same conditions apart from depths from the tread surface to floor faces of the grooves, which are described below.

In the pneumatic tire relating to the Comparative Example, the depths from the tread surface to the floor faces of grooves that form center blocks and shoulder blocks (circumferential grooves and lateral grooves) are all the same. The pneumatic tire relating to the Comparative Example has the following conditions.

Negative ratio of tread: 28%
Width of circumferential grooves: 9.5 mm (on equator), 5.0 mm (at shoulders)
Depth of circumferential grooves: 8.9 mm
Width of lateral grooves: 7.0 mm
Depth of lateral grooves: 8.9 mm
Width of circumferential sipes: 1.0 mm
Width of lateral sipes: 0.4 mm
Width of inclined narrow grooves: 1.5 mm
Diameter of pinholes: diam. 1.5 mm The pneumatic tire relating to the Example is the pneumatic tire relating to the earlier-described second exemplary embodiment (see FIG. 2 to FIG. 6). The pneumatic tire relating to the Example has the following conditions.

Negative ratio of tread: 28%
Width of circumferential grooves: 9.5 mm (on equator), 5.0 mm (at shoulders)
Depth of circumferential grooves: 8.9 mm
Width of lateral grooves: 7.0 mm
Depth of lateral grooves: 8.9 mm
Depth to raised floor faces: 7.0 mm
Depth to highest raised floor faces: 3.5 mm
Width of circumferential sipes: 1.0 mm
Width of lateral sipes: 0.4 mm
Width of inclined narrow grooves: 1.5 mm
Diameter of pinholes: diam. 1.5 mm For the pneumatic tires relating to the Comparative Example and the Example, handling stability on a dry road surface, handling stability and hydroplaning on a wet road surface, and acceleration performance, braking performance and handling stability on an icy/snowy road surface are described with reference to Table 1.

TABLE 1

| | | Comparative Example | Example |
|---|---|---|---|
| Dry road surface | Handling stability | 100 | 105 |
| Wet road surface | Handling stability | 100 | 105 |
| | Hydroplaning | 100 | 105 |
| Icy/snowy road surface | Acceleration performance | 100 | 102 |
| | Braking performance | 100 | 104 |
| | Handling stability | 100 | 105 |

<Handling Stability on Dry Road Surface>

Each pneumatic tire was mounted to a vehicle and run along a dry road surface test course at a constant speed. Handling stability of the pneumatic tire relating to the Example was evaluated for feeling by a professional driver, with handling stability of the pneumatic tire relating to the Comparative Example being "100". Here, the greater the index, the more excellent the handling stability.

This result shows that the pneumatic tire relating to the Example is more excellent in handling stability on a dry road surface than the pneumatic tire relating to the Comparative Example.

<Handling Stability on Wet Road Surface>

Each pneumatic tire was mounted to the vehicle and run along a wet road surface test course at a constant speed. Handling stability of the pneumatic tire relating to the Example was evaluated for feeling by the professional driver, with handling stability of the pneumatic tire relating to the Comparative Example being "100". Here, the greater the index, the more excellent the handling stability.

This result shows that the pneumatic tire relating to the Example is more excellent in handling stability on a wet road surface than the pneumatic tire relating to the Comparative Example.

<Hydroplaning on Wet Road Surface>

Each pneumatic tire was mounted to the vehicle. The pneumatic tire relating to the Comparative Example was cornered on the wet road surface test course (a J-turn with a radius of 100 m) with increments in speed of 5 km/h. The highest speed at which line-tracing during the cornering was not possible was taken as "100". The highest speed at which line-tracing is not possible during cornering of the pneumatic tire relating to the Example is shown as an index. Here, the greater the index, the more hydroplaning is avoided.

This result shows that the pneumatic tire relating to the Example may avoid hydroplaning during cornering on a wet road surface more than the pneumatic tire relating to the Comparative Example.

<Acceleration Performance on Icy/Snowy Road Surface>

Each pneumatic tire was mounted to the vehicle. On an icy/snowy road surface test course, a time of acceleration from a speed of 0 km/h to 20 km/h of the pneumatic tire relating to the Comparative Example was taken as "100". A time of acceleration of the pneumatic tire relating to the Example is shown as an index. Here, the greater the index, the more excellent the acceleration performance.

This result shows that the pneumatic tire relating to the Example is more excellent in acceleration performance than the pneumatic tire relating to the Comparative Example.

<Braking Performance on Icy/Snowy Road Surface>

Each pneumatic tire was mounted to the vehicle. The pneumatic tire relating to the Comparative Example was run at 20 km/h on the icy/snowy road surface test course. A stopping distance from the brake of the vehicle being applied to 0 km/h was taken as "100". A stopping distance of the pneumatic tire relating to the Example is shown as an index. Here, the greater the index, the more excellent the braking performance.

This result shows that the pneumatic tire relating to the Example is more excellent in braking performance than the pneumatic tire relating to the Comparative Example.

<Handling Stability on Icy/Snowy Road Surface>

Each pneumatic tire was mounted to the vehicle and run along the icy/snowy road surface test course at a constant speed. Handling stability of the pneumatic tire relating to the Example was evaluated for feeling by the professional driver, with handling stability of the pneumatic tire relating to the Comparative Example being "100". Here, the greater the index, the more excellent the handling stability.

This result shows that the pneumatic tire relating to the Example is more excellent in handling stability on an icy/snowy road surface than the pneumatic tire relating to the Comparative Example.

| EXPLANATION OF REFERENCE NUMERALS | |
|---|---|
| 10 | Pneumatic tire |
| 12 | Tread |
| 14 | Center circumferential groove |
| 16 | Second circumferential groove |
| 18 | Shoulder circumferential groove |
| 20 | First lateral groove |
| 22 | Second lateral groove |
| 23 | Shoulder lateral groove |
| 24 | Triangular block |
| 26 | Center rectangular block |
| 28 | Second rectangular block |
| 30 | Shoulder block |
| 101 | Tread surface |
| 103 | Circumferential groove |
| 105 | Lateral groove |
| 107 | Center block |
| 107A | Inner side block |
| 107B | Outer side block |
| 107C | Triangular block |
| 109 | Shoulder block |
| 111 | Lateral sipe |
| 113 | Circumferential sipe |
| 115 | Raised floor groove |
| 115a | Raised floor face |
| 117 | Highest raised floor groove |
| 117a | Highest raised floor face |
| 119 | Inclined narrow groove |
| 121 | Pinhole |
| CL | Equator |
| R | Tire rotation direction |

What is claimed is:

1. A pneumatic tire comprising:

a center circumferential groove provided on an equator of a tread;

shoulder circumferential grooves provided at both sides in a tire lateral direction of the center circumferential groove of the tread and at tire lateral direction outermost sides;

first lateral grooves that are provided in the tread, extend away from the equator toward the shoulder circumferential grooves, and are inclined at $\theta_1°$ relative to a tire axial direction; and second lateral grooves that are provided in the tread, extend away from the equator toward the shoulder circumferential grooves, and are set to an inclination angle relative to the tire axial direction of $\theta_2°$, which is smaller than $\theta_1°$, wherein the first lateral grooves and the second lateral grooves merge at the shoulder circumferential grooves, and shoulder lateral grooves are provided in the tread, at an inclination angle relative to the tire axial direction of $\theta_3°$ of which is set to be smaller than $\theta_1°$, the shoulder lateral grooves extending from portions at which the first lateral grooves merge with the second lateral grooves toward tread ends, wherein, at a tread surface, lateral sipes extending in the tread lateral direction are formed in a plurality of blocks that are formed by the plurality of grooves extending in the tire circumferential direction and the tire lateral direction, of the plurality of blocks, center blocks which are disposed at the equator side are smaller than shoulder blocks which are provided at the lateral direction outer sides relative to the center blocks, at least a portion of the grooves that form the center blocks is formed with a raised floor face that is at a depth shallower than a depth from the tread surface to floor faces of the grooves that form the shoulder blocks, of an adjoining plurality of the center blocks, at least one block is a triangular block that is formed with a triangular shape in a plan view of the tread, and at least one of the grooves that form the triangular block is inclined upward toward a tapered obtuse angle corner portion at the floor face thereof and is formed with an inclined narrow groove that is narrower than the groove.

2. The pneumatic tire according to claim 1, wherein the inclination angle $\theta_3°$ of the shoulder lateral grooves is smaller than $\theta_2°$.

3. The pneumatic tire according to claim 1 wherein, of an adjoining plurality of the center blocks, at least a portion of the grooves that form one of the center blocks is formed with a highest raised floor face that is at a depth shallower than the depth to the raised floor face.

4. The pneumatic tire according to claim 1, wherein circumferential sipes extending in the circumferential direction are formed in the shoulder blocks.

5. The pneumatic tire according to claim 1, wherein pinholes are formed that are provided in the triangular block and extend inward from the tread surface in a tire radial direction.

* * * * *